March 28, 1961 S. M. RICH 2,977,157
SAFETY MEANS IN AIR BRAKE EQUIPMENT
Filed Jan. 6, 1958
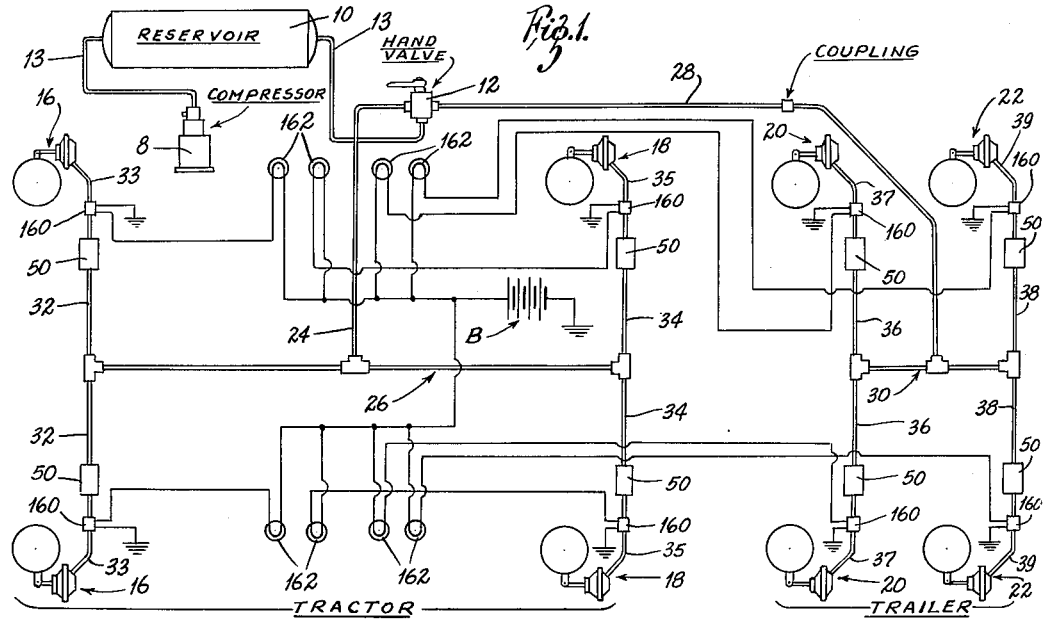
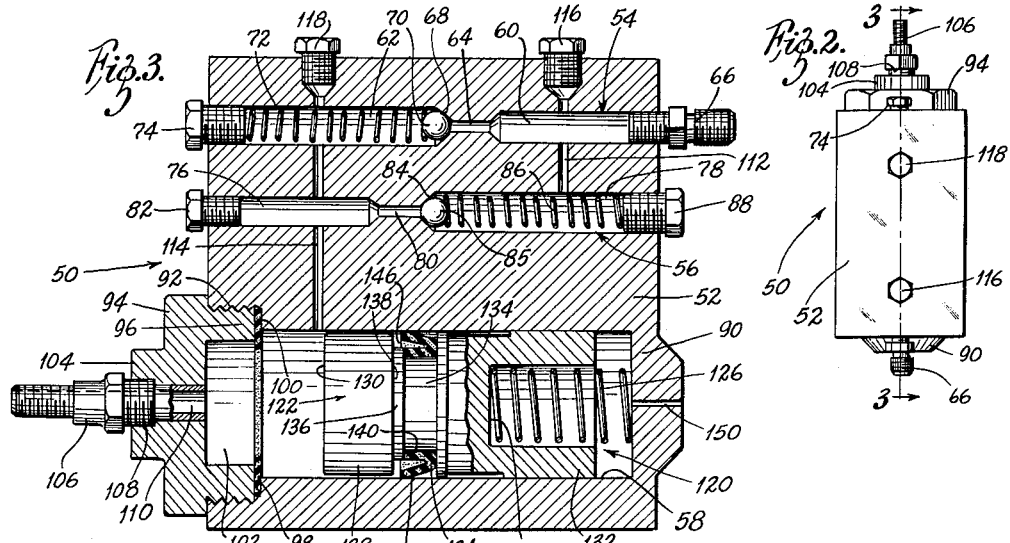
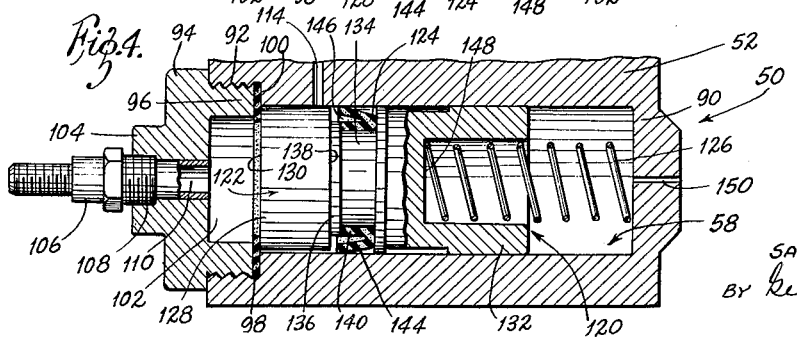
INVENTOR:
SAMUEL M. RICH,
By George J. Mager
HIS ATTORNEY 2,977,157
Patented Mar. 28, 1961

United States Patent Office

2,977,157
SAFETY MEANS IN AIR BRAKE EQUIPMENT

Samuel M. Rich, 15 Aberdeen Place, University City 5, Mo.

Filed Jan. 6, 1958, Ser. No. 707,209

2 Claims. (Cl. 303—84)

The present invention relates generally to means for ready incorporation in air brake equipment, and adapted to provide automatic safety features therein. Primarily though not necessarily, the present invention concerns air brake equipment of the type provided in tractor-trailer combinations, wherein the brakes of both vehicles are operatable in response to manipulations of a control valve by the tractor operator.

In some respect, this application is similar to the co-pending joint application of Rollie D. Hamilton and the inventor hereof, that application being identified as Serial No. 686,223, filed on September 25, 1957, now Patent No 2,899,024. Said patent is concerned with hydraulic brake equipment, whereas the present invention is directed to compressed air brake equipment, as hereinbefore indicated.

Generally, as is well known, conventional tractor-trailer air brake equipment includes a compressor, a compressed air storage tank or reservoir, brake mechanism associated with each of the tractor and trailer wheels, a control valve, and conduit connections for supplying compressed air simultaneously to the various brake mechanisms.

In addition to the mechanisms and appurtenances mentioned in the preceding paragraph, air brake equipment of the type under consideration includes various check valves, quick air release valves, governors, gauges and the like wherewith the present invention is not concerned. Also included in such equipment is a device adapted to energize the compressor whenever the pressure in the reservoir drops below a determined value. That is to say, whenever in consequence of a prior brake application some of the stored pressure has been dissipated, the compressor will automatically replenish the reservoir immediately, so that compressed air requisite for a subsequent brake application is always available.

Insofar as I am aware however, none of these air brake systems includes means for preventing operational failure or malfunctioning of the brakes in the event that one or more of the conduits leading to the wheel brake application mechanisms had been ruptured subsequent to the previous braking operation.

In other words, assuming that a tractor-trailer is being driven for example over a rough road, it sometimes happens that rocks, sticks, or other loose objects lying on the road will impinge against and rupture a line leading to one of the wheel brake mechanisms. Excessive vibration may also cause a break in one or more of said lines, so that, without knowledge thereof on the part of the tractor operator, his next brake application will not only be futile, but may result in disaster.

Stated otherwise, in the event a ruptured line is present in conventional air brake equipment, application of the brakes, particularly in an emergency, frequently results in a serious accident. Thus, when the tractor operator manipulates the control valve whereby to transmit requisite air power to the wheel brake mechanisms, most of said power discharges instead to atmosphere via the rupture in a line or lines, as is understood.

The primary object of the present invention is to provide means adapted to automatically prevent pressure losses in consequence of a ruptured line in air brake equipment of the type under consideration, and means adapted to visibly indicate to the operator that a ruptured line is existent in said equipment.

It is a further object in connection with said primary object, not only to visibly indicate to the operator that a ruptured line is existent in the equipment, but also to indicate the particular line wherein said rupture exists, so that repairs may be made at the earliest opportunity.

To this end, the present invention contemplates means comprising a plurality of valve assemblies interpolated in the pressure transmission lines of air brake equipment, and a plurality of signal lights or indicators operatively associated with said valve assemblies. It is a feature of the invention that these valve assemblies and signal elements may be incorporated in conventional air brake equipment without requiring any changes in the mode of operation heretofore practiced.

Each of the valve assemblies comprises a self-contained unit having inlet and outlet passages that are equipped with suitable fittings to facilitate interpolation of the unit in one of the lines. The movable valve mechanism is contained within the relatively small and compact housing of the unit. The housing is in the form of a light weight casting, preferably of aluminum. The movable mechanism includes a pair of check valve assemblies of the spring-pressed ball type. As will appear, these assemblies primarily control the flow of air pressure through the unit. The check valve assemblies are horizontally disposed in the upper half portion of the housing. A relatively large horizontal bore is disposed in the lower half portion of the housing, and constitutes a cylinder for a floating piston member. The head portion of the piston member is slightly smaller in diameter than the bore, and said piston is provided with a resilient annular flanged ring element sealingly engaging the internal periphery of said bore. A light compression spring constantly biases the piston member in a direction toward the outlet passage of the unit.

Normally, that is when the brake system is intact, the floating piston member occupies a position wherein fluent communication between the inlet and outlet passages of the unit will be established when the control valve is manipulated to brake application positions. However, in the event the line leading from the outlet passage of the unit to the brake mechanism becomes defective, the compression spring aforesaid will maintain said piston member in a position adapted to prevent establishment of the aforesaid communication between the inlet and outlet passages of the unit.

The signal lights would be disposed in full view of the tractor operator, and may be suitably marked to indicate the brake mechanism of the wheel or wheels wherewith they are associated, or they may be presented in a pattern corresponding to the wheel locations.

The illumination of said signal lights is controlled by conventional pressure responsive switches that may be of the normally open, or of the normally closed type. In accordance with the concepts of this invention, one of these switches is interpolated in each of the lines leading from the outlet end of a valve unit to a wheel brake mechanism.

The invention is illustrated on a sheet of drawings that accompanies this specification, and a more comprehensive understanding of the objectives and advantages thereof may be had from the detailed description to follow with reference to said drawings, wherein:

Figure 1 is a diagrammatical layout of conventional tractor-trailer air brake equipment provided with safety means in accordance with the concepts of the present invention;

Figure 2 is a top plan view of one of a plurality of valve units included in said safety means;

Figure 3 is an enlarged vertical sectional view taken on the line 3—3 of Figure 2; and Figure 4 is a fragmentary view similar to Figure 3, illustrating certain elements in moved positions.

The exemplary air brake equipment schematically shown in Figure 1 includes: a compressor 8; a compressed air storage tank or reservoir 10; a hand valve 12; tractor front wheel brake mechanisms 16; tractor rear wheel brake mechanisms 18; trailer front wheel brake mechanisms 20; trailer rear wheel brake mechanisms 22; a main pressure line 24 leading from the hand valve 12 to a tractor pressure header 26; a similar line 28 leading from said hand valve to a trailer pressure header 30; branch pressure lines 32, each leading from the header 26 to one of the brake mechanisms 16; similar lines 34, each leading from the header 26 to one of the brake mechanisms 18; branch pressure lines 36, each leading from the header 30 to one of the brake mechanisms 20; and similar lines 38, each leading from the header 30 to one of the brake mechanisms 22. It will be understood that the compressor 8, the reservoir 10, the hand valve 12, their interconnecting lines 13, the main pressure lines 24 and 28, together with the headers 26 and 30, and the branch lines leading therefrom are all protected against ordinary road hazards. The terminal portions 33, 35, 37, and 39 of the branch lines 32, 34, 36, and 38 respectively however, are subject to the hazards described, inasmuch as these are necessarily closer to ground level.

With reference now particularly to Figures 2 and 3, numeral 50 designates as a whole one of the safety valve units contemplated for incorporation in the branch lines referred to in the preceding paragraph.

Each unit 50 comprises a valve housing 52 that preferably is cast from aluminum, as noted hereinbefore. Formed in the housing 52 at an upper level, is a horizontal bored and counterbored passageway, generally designated 54, that extends from the inlet to the outlet end of said housing. Formed in the housing 52 at an intermediate level, is a similar passageway, generally designated 56, that also extends from the inlet to the outlet end of said housing. Formed in the housing 52 at a lower level, is a relatively large bore generally designated 58, which however, does not extend from end to end of said housing, and constitutes a cylindrical chamber for a piston assembly to be described hereinafter. It is to be understood of course, that the terms "upper," "lower" and "horizontal" as employed herein have been adopted in the interest of descriptive clarity with reference to the unit 50 illustrated, inasmuch as the units 50 may be installed in a brake system in any other feasible disposition without affecting the operability thereof.

The passageway 54 includes an inlet chamber portion 60, a concentric check valve chamber portion 62, and a port portion 64 of reduced diameter intermediate and connecting the chambers 60 and 62. Numeral 66 designates a fitting suitable to effect a connection between the chamber 60 and one of the branch lines 32, 34, 36 or 38, as will appear. At its inner end, the chamber 62 terminates in a conical valve seat 68 as shown. This seat cooperates with a ball element 70 to provide a check valve normally maintained closed in consequence of the biasing force of a light compression spring 72 that is interposed in chamber 62 between said ball element and a plug 74 sealing the outer end of said chamber.

The passageway 56 includes a pressure transmission chamber portion 76, a concentric check valve chamber portion 78, and a port portion 80 of reduced diameter intermediate and connecting the chambers 76 and 78. The outer end of chamber 76 is sealed by means of a plug 82. At its inner end, the chamber 78 terminates in a conical valve seat 84, as shown. This seat cooperates with a ball element 85 to provide a check valve normally maintained closed in consequence of the biasing force of a light compression spring 86 that is interposed in chamber 78 between said ball element and a plug 88 sealing the outer end of said chamber.

As noted, the bore 58 comprises a piston cylinder, defined at one end by a vertical wall section 90 provided in the inlet end portion of the housing 52. At its opposite end, the cylinder 58 terminates in an enlarged internally threaded counterbore 92. Numeral 94 designates a hollow plug member having an externally threaded segment 96 in engagement with the counterbore 92, a resilient gasket 98 being interposed between said plug member and an annular shoulder 100 in the housing, as shown.

Provided in the segment 96 of the plug member, is a circular recess 102 of smaller diameter than the bore 58, and said plug member has an internally threaded hollow boss segment 104 projecting laterally therefrom. Numeral 106 designates a fitting suitable to effect a connection between the cylinder 58 of the housing, and one of the terminal lines 33, 35, 37 or 39, as will appear. The fitting 106 has an externally threaded portion 108 in engagement with the boss segment 104, and a tubular extension 110 in communication with the circular recess 102, as illustrated.

A first vertical bore 112 is provided in the inlet end portion of the housing 52, and a second similar bore 114 is provided in the outlet end portion thereof. The bore 112 connects the inlet chamber 60 and the check valve chamber 78. The bore 114 interconnects the check valve chamber 62, the pressure transmission chamber 76, and the cylinder 58. The upper end of the bore 112 is sealed by means of a plug 116, that of the bore 114 by means of a plug 118. It will also be understood that the terms "vertical" and "horizontal" when employed herein have reference to the illustrated disposition of parts as viewed in the drawings.

As hereinbefore stated, a floating piston assembly is disposed in the bore or cylinder 58. This assembly, generally designated 120 includes a piston 122, a resilient piston ring member 124, and a light compression spring 126.

The diameter of the piston head 128 is slightly smaller than that of the cylinder 58, and as viewed in Figures 3 and 4, the left end face 130 of said piston head it flat. The piston 122 further includes a hollow body portion 132, and a connecting portion or neck 134 that merges into a circular shoulder 136 projecting from the right end face 138 of the piston head.

The ring member 124 includes a sleeve portion 140 surrounding the neck 134, and an outwardly flared flange 144 that sealingly engages the inner peripheral surface of the cylinder 58, and forms in conjunction with said surface, the right end face 138 of the piston head, and the outer periphery of the sleeve portion 140, an annular V-shaped recess or cavity designated 146. The provision of this cavity constitutes an important feature of the present invention for a reason to be clarified hereinafter. The piston body 132 has a circular cavity that provides a spring seat 148 formed therein, and the light compression spring 126 is interposed between said seat and the housing wall section 90, thus biasing the piston member leftwardly at all times. Numeral 150 indicates an air vent provided in the wall section 90 so that rightward movements of the piston will not be restricted.

It will be understood that suitable bracket or other appropriate means are contemplated for supporting the units 50, after these have been interpolated in the branch lines. Any showing of such supports has been omitted in the drawings, inasmuch as these may vary considerably in different installations.

As previously stated, a conventional pressure-responsive switch is associated with each valve unit 50, these switches being interpolated in the terminal pressure lines between said units and the wheel brake operating mechanisms.

Reverting to Figure 1, said switches are shown diagrammatically and designated 160. Each switch is both grounded and connected into an electrical circuit including the usual battery B. It will be assumed that the switches 160 are of the normally open type, and will close whenever air pressure of a determined value is existent in the particular lines wherein they are interpolated.

Each switch 160 controls a signal lamp 162 suitably mounted for visual observation by the tractor operator as he manipulates the hand valve 12. Preferably, the lamps 162 are arranged in a pattern corresponding to the wheel brake mechanisms of the tractor-trailer, or they may be appropriately marked to indicate the particular valve unit 50 and brake mechanism with which each is associated. Consequently, as the operator manipulates the valve 12 to brake applying position, he will become immediately aware when one of the lamps 162 fails to light up, that a particular terminal line has become defective.

Operation

It will be assumed that a tractor-trailer combination vehicle has been loaded, and is in readiness for departure from a warehouse, dock, loading platform, or the like. After turning on the ignition, the operator would test the brakes before placing the tractor in gear. As the operator moves the hand valve 12 to brake application position, air pressure flowing through the valve units 50 and the terminal lines 33, 35, 37, and 39, will close the switches 160, so that all of the signal lamps 162 light up in full view of said operator, provided that all of the brake mechanisms 16, 18, 20, and 22 were being supplied. In the event however, that one of the terminal lines had become defective, the signal lamp 162 of that particular circuit would fail to light up, in consequence whereof the operator would become cognizant of the defective condition, and repairs would be made.

For the present, it will be assumed that all of the signal lamps 162 are energized when the hand valve 12 is manipulated, so that the operator knows the tractor-trailer brake equipment is for the time being at least, in fully operable condition for the contemplated journey. Wherefore the operator will manipulate the hand valve to neutral or brake-releasing position and proceed, as is understood. All of the signal lamps will be "dark," inasmuch as in conventional air brake equipment practically all pressure in the lines above atmospheric pressure will have been exhausted via the conventional quick-release valves adjacent to the wheel brake mechanisms, and the hand valve 12 when the brakes were released, and inclusion of the present invention therein does not effect this customary operation of the equipment.

It will be remembered that the compressor 8 automatically replenishes the reservoir 10 whenever compressed air is drawn therefrom, so that a constant supply of pressure is available for the next brake application.

Assuming now that such next brake application is required, air pressure from the reservoir 10 would flow through the hand valve 12 into the headers 26 and 30 via the main lines 24 and 28. Ordinarily, the air pressure would proceed directly from said headers through the conventional quick-release valves to the brake mechanisms 16, 18, 20, and 22 via the lines 32, 34, 36, and 38 respectively. In accordance with the concepts of my invention however, this air pressure would first be directed from these lines through the safety valve units 50, and thence through the terminal lines 33, 35, 37, and 39 before reaching the brake mechanisms aforesaid.

Normally, that is when the hand valve 12 is in neutral or brake released status, and provided all of the lines 33, 35, 37, and 39 are intact, the check valves of each unit 50 will be disposed in the manner illustrated in Figure 3, whereas the piston assembly 120 of each unit 50 will be disposed in the manner illustrated in Figure 4. Stated otherwise, whenever the hand valve 12 is in neutral status, the spring 72 will maintain the ball 70 against the seat 68, the spring 86 will maintain the ball 85 against the seat 84, and the spring 126 will maintain the piston head end face 130 against the gasket 98.

Inasmuch as all of the valve units 50 and the therewith associated normally open pressure responsive switches 160 concurrently operate in identical fashion, it will be assumed that the valve unit 50 depicted in Figures 2 through 4 is the one interpolated in the branch line 32 and its terminal line 33 leading from the header 26 to the right front tractor wheel brake mechanism 16, and that at the conclusion of the preceding brake application, the piston assembly 120 would be disposed in the status thereof demonstrated in Figure 4.

In other words, during the preceding brake application, air under determined pressure (e.g. 115 p.s.i.) from the reservoir 10 entered the chamber 60 via line 32 and fitting 66. As a result, the check valve ball element 70 was unseated and the pressure flowed via bore 114, cylinder 58, fitting 106, and terminal line 33 to the brake mechanism 16. Stated in more detail, when the air blast via the bore 114 entered the space in cylinder 58 about the periphery of the piston head 128, it instantaneously filled the cavity 146 and the annular space in the cylinder 58 about the piston head 128, thereby effecting a slight rightward movement of the piston assembly against the biasing force of the spring 126. Concurrently with this breaking of the seal between the gasket 98 and the end face 130 of the piston head, back pressure built up in the recess 102, the extension 110, the fitting 106, and the terminal line 33 forced the piston assembly 120 rightwardly, overcoming the leftward bias of the spring 126 until the piston head 128 cleared the lower end of the bore 114, this disposition of the piston assembly being clearly illustrated in Figure 3. As the air pressure passed through the last named line, the right front tractor wheel switch 160 closed, so that the associated signal light 162 was energized.

When the brake was released, any pressure that did not exhaust via the quick release valve returned via line 33, fitting 106, cylinder 58, bore 114, chamber 78, bore 112, chamber 60, fitting 66, branch line 32 and so on to the hand valve 12, where it discharged to atmosphere, as the signal light 162 went off, and the left end face 130 of the piston head 122 was brought into sealing disposition against the gasket 98.

When the next brake applying operation is initiated, the air blast via bore 114 would enter the cavity 146 to move the piston assembly 120 rightwardly against the biasing force of the spring 126 to the position thereof illustrated in Figure 3. Simultaneously, the air pressure would of course proceed onwardly to the brake mechanism in the manner described.

Assuming line 33 to be broken, when the operator next manipulates the hand valve for an application of brakes, air pressure entering the cylinder chamber 58 via the bore 114 and against the piston head periphery will be ineffectual to move the piston assembly 120 rightwardly, thus obviating pressure loss via the broken line. At the same time, the operator will be alerted to the fact that pressure is not reaching the tractor right front wheel brakes because the signal lamp therewith associated failed to light up when he operated the hand valve.

Stated in more detail, when the air blast via the bore 114 enters the space in cylinder 58 about the periphery of the piston head 128, it instantaneously fills the cavity 146 thereby effecting a slight rightward movement of the piston assembly against the biasing force of the spring 126. However, because of the break existent in the line ahead of the piston, no back pressure will build up in the recess 102 and therebeyond, so that the piston head will not move rightwardly from its Figure 4 to its Figure 3 position. Consequently all loss of air pressure, except a negligible amount that escapes about the piston end face and gasket contacting region, will be prevented, thus assuring full braking power for the remaining brakes of the vehicle.

In view of the foregoing, it should be manifest that the present invention provides novel means for automatically preventing complete brake failure. It should likewise be manifest that after a broken line has been repaired, nothing need be done with respect to its associated valve unit 50. In other words, the piston assembly 120 is always in its Figure 4 position except during braking operations when the line leading to the brake mechanism is intact. Only at such times will said piston assembly be in its Figure 3 position.

As hereinbefore observed, the valve units 50 of the present invention are designed for incorporation in conventional air brake equipment. As is well known, most of the more modern air brake systems are equipped with a quick release valve adjacent each wheel brake mechanism. These valves however, do not affect the described operation of the present invention, which will function whether or not quick release valves are present in the lines, the only difference being that when such valves are present, air pressure in the lines adjacent the brake mechanisms will exhaust to atmosphere more rapidly.

It is of course to be understood that whereas the detailed description of operation has been directed to the right front wheel brake mechanism of the tractor, all of the valve units 50, pressure responsive switches 160, and signal lamps 162 operate in like manner, whether interpolated in the tractor or the trailer portion of the air brake equipment. It is also noted, that graduated brake control may be had in the customary manner, and that the brake mechanisms function in the usual manner.

The foregoing description and reference to the drawings is believed adequate for a complete understanding of my invention. Inasmuch as intermittent partial applications of the brakes in rounding curves and so on is routine on the part of the operator, he will be regularly reminded that all of the wheel brakes are functioning properly, or that one and perhaps two of them are not functioning and should therefore be repaired at the first opportunity. It should thus be manifest that the invention provides novel means to render air brake equipment safe.

It will be understood that although primarily concerned with tractor-trailer air brake equipment such as that typified in Figure 1, the present invention is not limited to such installations, but may also be employed to provide similar safety means in other air brake equipment.

What I claim is:

1. In tractor-trailer air brake equipment of the type described including terminal lines for supplying air pressure simultaneously to each of the brake operating mechanisms, means adapted to insure the operability of the other brake mechanisms even though the terminal line leading to any one of the included brake mechanisms has been broken, said means comprising a shutoff valve unit interpolated in each terminal line at a selected point remote from the brake mechanism and including in combination: a valve housing; means providing for the passage of air pressure through said housing; a cylindrical bore in the housing, said bore being in communication with said means providing for the passage of air pressure through the housing; a piston assembly reciprocable in said bore, said assembly including a piston having a head portion, a body portion, and a connecting neck portion, the diameter of said head portion being slightly smaller than that of said bore and the diameter of the neck portion being smaller than that of the head portion; a circular shoulder projecting from one end face of the piston head portion, said neck portion merging into said shoulder; a resilient ring member including a sleeve portion encircling said neck portion and an outwardly flared annular flange portion integral therewith, the annular flange portion being adapted to engage the inner periphery of the cylindrical bore to form therewith and with the sleeve portion an annular V-shaped cavity in the ring member; an annular gasket having an internal diameter smaller than that of the cylindrical bore mounted in the housing at the outlet end of said bore; and a compression spring normally biasing the piston assembly toward said outlet end of the bore and into sealing engagement against said gasket.

2. In a shutoff valve unit interpolated in the terminal portion of an air pressure delivery line leading to a wheel brake operating mechanism incorporated in air brake equipment of the type disclosed, the combination of: a valve housing having an inlet and an outlet end portion; passageways formed therein providing for the flow of air pressure through said housing from the inlet to the outlet end portion and vice versa; a horizontal cylinder formed in the lower portion of the housing and extending from a vertical wall section of the inlet end portion of the housing to the outlet end portion thereof, said cylinder terminating in an enlarged threaded counterbore; a floating piston assembly disposed in said cylinder, said assembly including a piston member constantly biased toward the outlet end of the housing by a light compression spring interposed in said cylinder between said piston member and said vertical wall section of the housing, said piston member having a head portion, a body portion, and a connecting neck portion, the diameter of said head portion being slightly smaller than that of said cylinder, and the diameter of said neck portion being smaller than that of the head portion; a circular shoulder projecting from one end face of the piston head portion, said neck portion merging into said shoulder; a resilient ring member including a sleeve portion encircling said neck portion and an outwardly flared annular flange portion adapted to engage the inner periphery of the cylinder and to form therewith and with said sleeve portion an annular V-shaped cavity in said ring member; a gasket having an internal diameter smaller than that of said cylinder seated in said threaded counterbore thereof, said gasket being maintained in position by means of a hollow plug member having an externally threaded segment in engagement with said counterbore; a fitting projecting from the inlet end of the housing for effecting a connection between said unit and a pressure delivery line; and a fitting projecting from the hollow plug member for effecting a connection between the outlet end of said housing and the terminal portion of the air pressure delivery line aforesaid.

References Cited in the file of this patent
UNITED STATES PATENTS

| | | |
|---|---|---|
| 2,191,381 | Hanson | Feb. 20, 1940 |
| 2,664,101 | Cano et al. | Dec. 29, 1953 |
| 2,674,095 | Kirk | Apr. 6, 1954 |
| 2,792,916 | Williams | May 21, 1957 |
| 2,833,117 | Wilcocks | May 6, 1958 |
| 2,853,856 | Castner | Sept. 30, 1958 |
| 2,899,024 | Hamilton et al. | Aug. 11, 1959 |